United States Patent
Yoneda et al.

(10) Patent No.: US 7,432,313 B2
(45) Date of Patent: Oct. 7, 2008

(54) SOLVENT-FREE POLYMIDE SILICONE RESIN COMPOSITION AND A CURED RESIN FILM THEREOF

(75) Inventors: Yoshinori Yoneda, Annaka (JP); Michihiro Sugo, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 382 days.

(21) Appl. No.: 11/221,897

(22) Filed: Sep. 9, 2005

(65) Prior Publication Data

US 2006/0052476 A1 Mar. 9, 2006

(30) Foreign Application Priority Data

Sep. 9, 2004 (JP) ............... 2004-262005
Aug. 12, 2005 (JP) ............... 2005-234548

(51) Int. Cl.
*C08L 79/08* (2006.01)
*C08J 3/28* (2006.01)
*C08G 77/08* (2006.01)

(52) U.S. Cl. .................. 522/141; 522/142; 522/144; 522/148; 525/422; 528/25; 528/26

(58) Field of Classification Search ................. 525/422; 522/99, 148, 141, 142, 144
See application file for complete search history.

(56) References Cited

U.S. PATENT DOCUMENTS

| 4,499,149 | A | 2/1985 | Berger | |
|---|---|---|---|---|
| 5,589,319 | A * | 12/1996 | Katou et al. | 430/288.1 |
| 6,706,841 | B2 | 3/2004 | Sugo et al. | |
| 7,041,766 | B2 * | 5/2006 | Yoneda et al. | 528/26 |
| 7,141,614 | B2 * | 11/2006 | Okada et al. | 522/46 |
| 2004/0072982 | A1 | 4/2004 | Yoneda et al. | |

FOREIGN PATENT DOCUMENTS

| EP | 1 408 067 A1 | 4/2004 |
|---|---|---|
| JP | 7-268098 A | 10/1995 |

* cited by examiner

*Primary Examiner*—Susan W Berman
(74) *Attorney, Agent, or Firm*—Birch, Stewart, Kolasch & Birch, LLP

(57) ABSTRACT

A solvent-free polyimide silicone resin composition comprising
(a) a polyimide silicone resin having repeating units represented by the following formula (1-1) and repeating units represented by the following formula (1-2), a film of said resin with a thickness of 100 μm prepared on a quartz glass substrate having a light transmittance of 80% or higher at wavelengths of from 350 nm to 450 nm,
(b) a reactive diluent, and
(c) a photopolymerization initiator

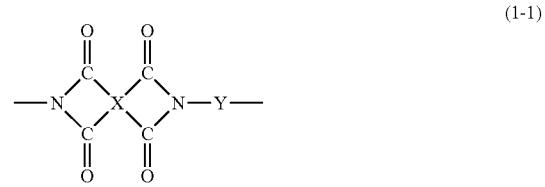

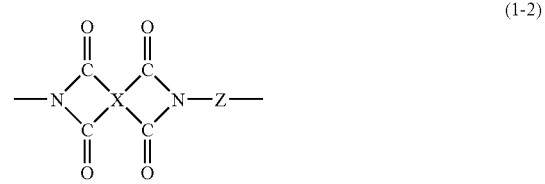

wherein X is a tetravalent organic group, Y is a divalent organic group, and Z is a divalent organic group represented by the following formula (2),

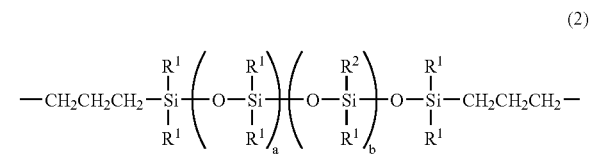

wherein $R^1$ may be different from each other and is a monovalent hydrocarbon group having 1 to 8 carbon atoms, which group may be substituted, $R^2$ is a monovalent hydrocarbon group having a photopolymerizable group, a and b are each an integer of from 1 to 100 with $a+b \leqq 100$.

21 Claims, 1 Drawing Sheet

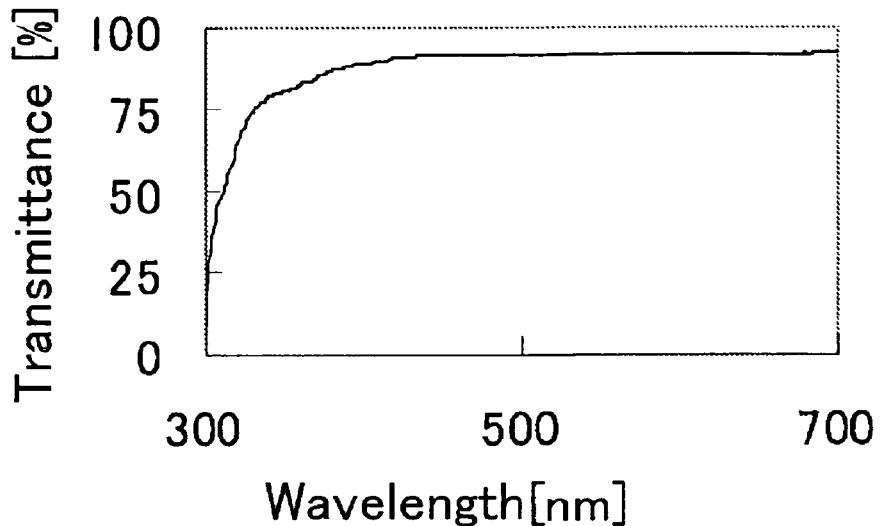
Fig.1 Transmission spectrum of the polyimide silicone of Preparation Example 1
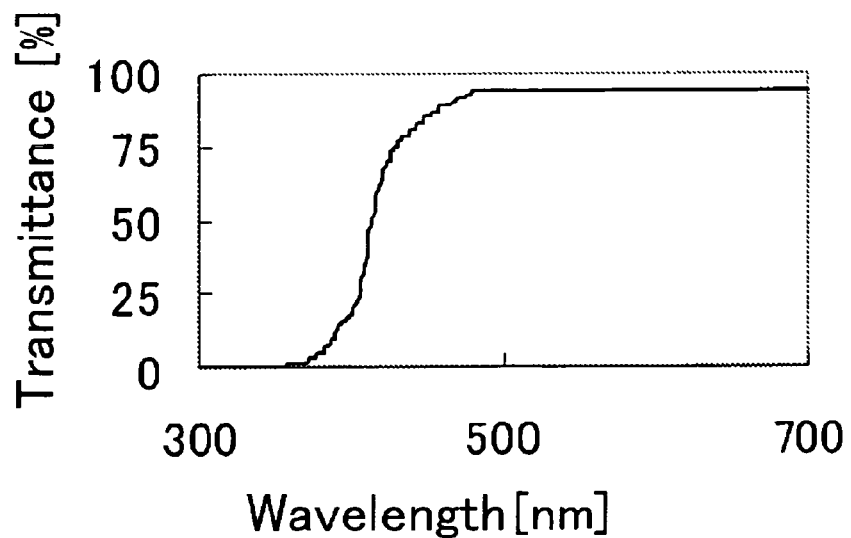
Fig.2 Transmission spectrum of the polyimide silicone in Preparation Example 5

SOLVENT-FREE POLYIMIDE SILICONE RESIN COMPOSITION AND A CURED RESIN FILM THEREOF

CROSS REFERENCES

This application claims the benefits of Japanese Patent application No.2004-262005 filed on Sep. 9, 2004, and Japanese Patent application No.2005-234548 filed on Aug. 12, 2005, the contents of which are hereby incorporated by reference.

FIELD OF THE TECHNOLOGY

This invention relates to a substantially solvent-free polyimide silicone resin composition useful as a coating material and an adhesive. This invention relates also to a resin film obtainable by curing the composition.

BACKGROUND OF THE INVENTION

In general, polyimide resins have high heat resistance and good electrical insulation, and find use in printed circuit boards and heat resistant adhesive tapes. They are also used as resin varnish to form surface protective films and interlayer insulating films for electric parts and semiconductor materials. Polyimide resins, however, are soluble in only a limited number of solvents. Accordingly, it is a common practice to coat a substrate with a solution of polyamic acid which is a precursor for polyimide and is relatively soluble in various solvents, and then to treat the coating at an elevated temperature to effect dehydration and cyclization into a polyimide resin.

Meanwhile, for the purpose of improving the solubility of polyimide resins in solvents, enhancing the adhesion thereof to substrates, and imparting flexibility thereto, an attempt has been made to introduce siloxane chain into polyimide skeleton as disclosed in Japanese Patent Application Laid-Open No.7-268098. However even in this case, the polyimide resin has to be generally diluted with solvent for use. This necessitates a step of removing the solvent by, for instance heating, after the polyimide resin solution is applied or coated to a substrate. Further, measures for keeping good working environment, such as ventilation, are also required.

Japanese Patent Laid-Open Application No.2002-332305 discloses a solvent-free polyimide silicone resin composition. The composition contains a (meth)acrylic compound as a reactive diluent compound to thereby attain high adhesion to a substrate with various shapes and enable one to eliminate a step of removing a solvent after an application process such as coating.

The aforesaid polyimide silicone has drawback that the resin is colored, so that it cannot be applied to an object the color of which is important. To solve this problem, Japanese Patent Application Laid-Open No. 2004-149777 discloses a transparent and colorless polyimide silicone resin obtained mainly form aliphatic tetracarboxylic acid. However, the resin has little compatibility with a reactive diluent and a cured film from a mixture of the resin and the diluent is cloudy.

SUMMARY OF THE INVENTION

An object of the present invention is to provide a solvent-free polyimide silicone resin composition which gives a transparent and colorless cured film without having the aforesaid problem.

As a result of extensive studies, the present inventors have found that the aforesaid object can be attained by introducing a photopolymerizable group in the transparent and colorless polyimide silicone resin.

Thus the present invention is a solvent-free polyimide silicone resin composition comprising (a) a polyimide silicone resin having repeating units represented by the following formula (1-1) and repeating units represented by the following formula (1-2), a film of said resin with a thickness of 100 μm prepared on a quartz glass substrate having a light transmittance of 80% or higher at wavelengths of from 350 nm to 450 nm, (b) a reactive diluent, and (c) a photopolymerization initiator

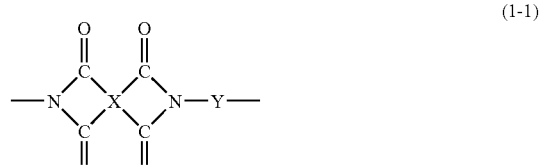

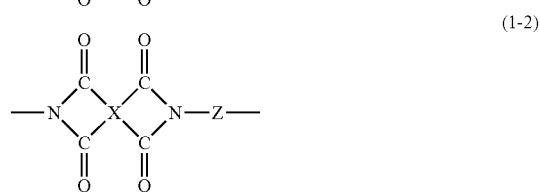

wherein X is a tetravalent organic group, Y is a divalent organic group, and Z is a divalent organic group represented by the following formula (2),

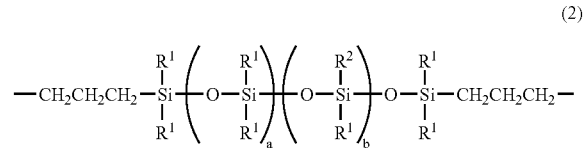

wherein $R^1$ may be different from each other and is a monovalent hydrocarbon group having 1 to 8 carbon atoms, which group may be substituted, $R^2$ is a monovalent hydrocarbon group having a photopolymerizable group, a and b are each an integer of from 1 to 100 with $a+b \leq 100$.

The polyimide silicone composition of the present invention gives a colorless and transparent cured film. It can be used for electric parts and optical parts which require sensuousness as well as for conventional applications such as printed circuit boards, heat resistant adhesive tapes, insulation films, surface protective films, and protective films on electrodes.

BRIEF DESCRIPTION OF THE DRAWINGS

FIG. 1 shows the transmission spectrum of the polyimide silicone resin prepared in Preparation Example 1.

FIG. 2 shows the transmission spectrum of the polyimide silicone resin prepared in Preparation Example 5.

DETAILED DESCRIPTION OF THE INVENTION

"Solvent free" herein encompasses a situation where substantially no solvent exists or only a non-substantial amount of a solvent exits.

The polyimide silicone resin having repeating units of the formula (1-1) and repeating units of the formula (1-2) may be prepared by reacting a tetracarboxylic acid dianhydride which bears the residue X with a diamine which bears the residue Y and a diaminosiloxane which bears the residue Z.

It is preferred that the tetracarboxylic acid dianhydride has no or little absorption in the ultraviolet to visible light region and does not tend to form a charge transfer complex after imidization.

Aliphatic and alicyclic tetracarboxylic dianhydrides are preferred because they do not prevent light absorption. Examples of the aliphatic tetracarboxylic dianhydrides include butane-1,2,3,4-tetracarboxylic dianhydride and pentane-1,2,4,5-tetracarboxylic dianhydride. Examples of the alicyclic tetracarboxylic dianhydrides include cyclobutane-1, 2,3,4-tetracarboxylic dianhydride, cyclohexane-1,2,4,5-tetracarboxylic dianhydride, dicyclohexyl-3,4,3',4'-tetracarboxylic dianhydride, bicyclo[2.2.1]heptane-2,3,5,6-tetracarboxylic dianhydride, 2,3,4,5-tetrahydrofurantetracarboxylic dianhydride, and bicyclo[2.2.2]oct-7-ene-2,3,5,6-tetracarboxylic dianhydride.

Use may also be made of aliphatic tetracarboxylic dianhydrides having an aromatic ring, such as 1,3,3a,4,5,9b-hexahydro-5-(tetrahydro-2,5-dioxo-3-furanyl)-naphtho[1, 2-c]furan-1,3-dione, and 1,3,3a,4,5,9b-hexahydro-5-methyl-5-(tetrahydro-2,5-dioxo-3-furanyl)-naphtho[1,2-c]furan-1,3-dione. Aromatic tetracarboxylic dianhydrides which have superior heat resistance may also be used as far as they do not prevent photopolymerization initiator from absorbing light. Examples of the aromatic tetracarboxylic dianhydrides include pyromellitic dianhydride, 3,3',4,4'-benzophenonetetracarboxylic dianhydride, 3,3',4,4'-diphenyl ether tetracarboxylic dianhydride, 4,4'-hexafluoropropylidenebisphthalic dianhydride, and 3,3',4,4'-diphenylsulfone tetracarboxylic dianhydride. These tetracarboxylic dianydrides may be used alone or in combination of two or more of the acid dianhydrides.

Among the aforesaid tetracarboxylic dianhydrides, preferred are those which bear the residues expressed by the following formula (3), (4), (5), (6) or (7), that is, butane-1,2, 3,4-tetracarboxylic dianhydride, bicyclo[2.2.2]oct-7-ene-2, 3,5,6-tetracarboxylic dianhydride, cyclobutane-1,2,3,4-tetracarboxylic dianhydride, 1,3,3a,4,5,9b-hexahydro-5-(tetrahydro-2,5-dioxo-3-furanyl)-naphtho[1, 2-c]furan-1,3-dione, and cyclohexane-1,2,4,5-tetracarboxylic dianhydride.

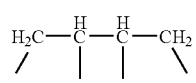

(3)

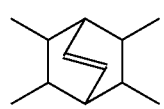

(4)

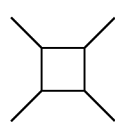

(5)

-continued

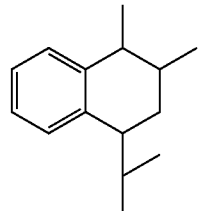

(6)

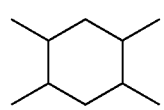

(7)

Preferred diamines are those have less light absoprtion in the ultraviolet to visible light region and do not tend to form a charge transfer complex after imidation. Aliphatic diamines are preferred because they do not prevent light absorption. However, aromatic diamines which have superior heat resistance may also be used as far as they do not prevent the photopolymerization initiator from absorbing light. Examples of the aliphatic diamines include tetrametylenediamine, 1,4-diaminocyclohexane, and 4,4'-diaminodicyclohexylmetahne; and examples of the aromatic diamines include phenylenediamine, 4,4'-diaminodiphenylether, and 2,2-bis(4-aminophenyl)propane. These may be used alone or in combination of two or more of them.

The diaminosiloxane residue is represented by the following formula (2).

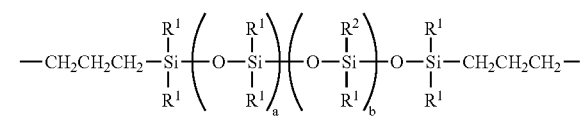

(2)

In the formula (2), $R^1$ may be different from each other and may be substituted. $R^1$ is a monovalent hydrocarbon group having 1 to 8 carbon atoms and does not have a photopolymerizable group. Examples of $R^1$ include alkyl groups suchasmethyl, ethyl, propyl, butyl, pentyl, and hexyl groups; cycloalkyl groups such as cyclopentyl and cyclohexyl groups; aryl groups such as phenyl and xylyl groups; aralkyl groups such as benzyl and phenetyl groups; halogenated alkyl groups such as 3,3,3-trifluoropropyl and 3-chloropropyl groups; trialkoxysilylalkyl groups such as 2-(trimethoxysilyl)ethyl group; alkoxy groups such as methoxy, ethoxy, and propoxy groups; aryloxy groups such as phenoxy group; and a cyano group. Among these, methyl, ethyl and phenyl groups are preferred.

The polyimide silicone resin in the present composition is characterized in that it has a monovalent hydrocarbon group, $R^2$, which has a photopolymerizable group. The photopolymerizable group as used herein means a group which can polymerize by irradiation of light, for example, in a range of ultraviolet light to visible light. Examples of $R^2$ include alkenyl groups such as vinyl, allyl, propenyl, isopropenyl and butenyl groups; (meth)acryloyl groups; and (meth)acryloyloxyalkyl groups such as (meth)acryloyloxypropyl group. Because of easiness of synthesis, preferred are alkenyl groups, among which a vinyl group is more preferred.

In the formula (2), a and b are each an integer of from 1 to 100 with a+b≦100. If a+b exceeds the aforesaid upper limit, a polyimide silicone resin composition tends to have smaller adhesion to various substrates. The value, b/(a+b), which represents an approximate content of the photopolymerizable group per molecule, is at least 0.05, preferably at least 0.1. If b/(a+b) is smaller than the aforesaid lower limit, a polyimide silicone resin composition may not show good transparency after cured. There is no particular preference of upper limit for b/(a+b).

The organosiloxane residue, Z, is present preferably in an amount of 30 mass % or more, more preferably 40 mass % or more, in the polyimide silicone resin. If it is present in amount less than 30 mass %, a polyimide silicone resin is less soluble in a diluent and does not show flowability at a temperature of 25° C. The organosiloxane residue is preferably present in an amount of 90 mass % or less, particularly 80 mass % or less. Accordingly, a molar amount of the unit (1-1), p, and a molar amount of the unit (1-2), q, are preferably selected so that the amount of the oranosiloxane residue in the polyimide silicone resin would be in the aforesaid range, and that q/(p+q) is in the range of from 0.1 to 0.95, particularly from 0.2 to 0.85.

A weight average molecular weight of the polyimide silicone resin preferably ranges from 5,000 to 100,000, more preferably from 10,000 to 700,000. If the molecular weight is less than the aforesaid lower limit, the film obtained by curing a polyimide silicone resin composition is brittle. Meanwhile, if the molecular weight exceeds 100,000, the compatibility with a reactive diluent may be worse.

The polyimide silicone resin may be prepared according to a known method; first, acid dianhydride, diamine, and diaminopolysiloxane are put in a solvent and the resulting mixture is subjected to a reaction at a low temperature, such as a temperature between 20 and 50° C., to obtain polyamic acid, a precursor for a polyimide resin. Then, the resulting solution of polyamic acid is heated preferably to a temperature of from 80 to 200° C., particularly from 140 to 180° C., to cause a dehydration and ring-closure reaction of an acid amide of the polyamic acid to yield a polyimide silicone resin solution. This solution is poured into a solvent, such as water, methanol, ethanol, or acetonitrile, to thereby form precipitates. The precipitates are dried to obtain the polyimide silicone resin.

The molar ratio of the combined amounts of the diamine and the diaminopolysiloxane to the tetracarboxylic dianhydride may properly be determined, and may be in the range of from 0.95 to 1.05, preferably from 0.98 to 1.02. As the solvent to be used in the preparation of the polyimide silicone resin, mention may be made of N-methyl-2-pyrrolidone, cyclohexanone, gamma-butyrolactone and N,N-dimethylacetamide. It is also possible to use aromatic hydrocarbons such as toluene and xylene in addition to the aforesaid solvents in order to facilitate the azeotropic removal of the resulting water in the course of imidization. These solvents may be used alone or in combination of two or more of the solvents.

In order to control the molecular weight of the polyimide silicone resin, a mono-functional compound such as phthalic anhydride or aniline may be added as a raw material to the reaction mixture. The mono-functional compound may be added preferably in an amount of less than 2 mol % relative to the polyimide silicone resin.

Imidization may be carried out using a dehydrating agent and an imidization catalyst in the imidization step. The reaction mixture is heated to approximately 50° C., if necessary. In this method, acid anhydride may be used, such as acetic anhydride, propionic anhydride, or trifluoroacetic anhydride as the dehydrating agent. The dehydrating agent may be used preferably in an amount of from 1 to 10 moles per mole of diamine. As the imidization catalyst, tertiary amines may be used, such as pyridine, collidine, lutidine, or triethylamine. The imidization catalyst may be used preferably in amount of from 0.5 to 10 moles per mole of the dehydrating agent used. This imidization method is beneficial because the reaction solution is not exposed to a high temperature and, accordingly, the resulting resin is less discolored.

If a plurality of the diamines or the tetracarboxylic dianhydrides, or both, are used, the reaction method is not particularly limited. For instance, all of the raw materials may be mixed together and then subjected to condensation copolymerization. Alternatively, two or more of the diamines or tetracarboxylic dianhydrides may be added in series to react individually.

The polyimide silicone resin thus prepared is characterized in that the film thereof prepared on a quartz glass substrate in a thickness of 100 μm shows a light transmittance of 80% or higher at wavelengths of from 350 nm to 450 nm in ultraviolet-visible light absorption spectrometry.

The present composition further comprises a reactive diluent (b). Any reactive diluent can be used as far as it can be reacted by an after-mentioned photopolymerization initiator. Examples of the reactive diluent include (meth)acrylate and vinylether compounds. Because of their versatility and variet, the (meth)acrylic compounds are preferred. The (meth)acrylic compounds include both acrylic compounds and methacrylic compounds.

Preferred (meth)acrylic compounds are (meth)acrylate represented by the following formula (7) and (meth)acrylamide represented by the following formula (8).

$$CH_2\!=\!CR^4COOR^3 \tag{7}$$

$$CH_2\!=\!CR^4CONR^3{}_2 \tag{8}$$

wherein $R^3$ may be different from each other and is an alkyl group, preferably having 1 to 20 carbon atoms, more preferably from 1 to 10 carbon atoms, and $R^4$ is a hydrogen atom or a methyl group.

Examples of (meth)acrylate include methyl(meth)acrylate, ethyl(meth)acrylate, isobutyl(meth)acrylate, isobornyl (meth)acrylate, glycidyl(meth)acrylate, 3,4-epoxycyclohexylmethyl(meth)acrylate, 2-hydroxyethyl(meth)acrylate, 2-hydroxypropyl(meth)acrylate, 2-hydroxybutyl(meth) acrylate, trifluoropropyl(meth)acrylate, perfluoro-butylethyl (meth)acrylate, perfluorooctylethyl(meth)acrylate, (meth) acryloxypropyltrimethoxy silane, and (meth)acryloxypropylmethyldimethoxy silane. These can be used alone or a mixture of two or more of them.

Examples of the acrylic amides are N,N-dimethylacrylamide and N,N-diethylacrylamide.

To enhance mechanical strength and adhesion to substrates, a multifunctional (meth)acrylate may be added in addition to the aforesaid mono(meth)acrylate.

In the present composition, the photopolymerization initiator (c) is an agent which initiates polymerization mostly by generating a radical when it is irradiated with ultraviolet to visible light. The photopolymerization initiators selected from acetophenone derivatives, benzophenone derivatives, benzoin ether derivatives, and xanthone derivatives are preferred because of versatility and rapid curing.

Examples of the photopolymerization initiator include diethoxyacetophenone, 2-hydroxy-2-methyl-1-phenylpropan-1-one, 2,2-dimethoxy-2-phenylacetophenone, 1-hydroxycyclohexyl phenyl ketone, isobutylbenzoin ether, benzoin methyl ether, thioxanthone, isopropyl thioxanthone, 2-methyl-1-[4-(methylthio)phenyl]-2-morphorinopropane-1-one, and 2-benzyl-2-dimethylamino-1-(4-morphorinophenyl)-butanone-1.

Contents of the aforementioned polyimide silicone resin, the reactive diluent, and the photopolymerization initiator may be adjusted according to a viscosity of the polyimide silicone resin or the like. Typically, 20 to 2000 parts by mass of the reactive diluent (b) and 1 to 200 parts by mass of the polymerization initiator (c) are contained per 100 parts by mass of the polyimide silicone resin (a). More typically, 30 to 1000 parts by mass of the reactive diluent (b) and 2 to 100 parts by mass of the polymerization initiator (c) are contained per 100 parts by mass of the polyimide silicone resin (a).

A viscosity of the polyimide silicone composition of the present invention may be adjusted according to an application of the composition. From the practical viewpoint, the composition is preferably flowable at 25° C. with a viscosity of 10,000 Pa×s or lower, more preferably of from 0.01 to 5,000 Pa×s, most preferably from 0.1 to 1,000 Pa×s at 25° C.

The polyimide silicone composition of the present invention can be applied on various substrates, for example, metals such as metals such as iron, copper, nickel, and aluminum; inorganic substrates such as glass; and organic resins such as epoxy resins and acrylic resins.

EXAMPLES

The present invention will be elucidated with reference to the following Examples, but not limited thereto.

Preparation Example 1

In a flask provided with a stirrer, a thermometer, and nitrogen purge equipment, 30.0 g (0.1 mole) of 1,3,3a,4,5,9b-hexahydro-5-(tetrahydro-2,5-dioxo-3-furanyl)-naphtho[1,2-c]furan-1,3-dione, 250 g of N,N-dimethylacetamide, and 100 g of toluene were placed. Subsequently, to the above flask, 12.6 g (0.025 mole) of 2,2'-[2-hydroxy-3-(3,5-dimethyl-4-amino)-benzyl-5-methyl]-diphenylmethane was added. The reaction mixture was kept at 50° C. for 3 hours. Then, 66.6 g (0.075 mole) of diaminovinylsiloxane represented by the following formula (9) was added dropwise at room temperature. After the addition was completeded, the reaction mixture was stirred at room temperature for 12 hours.

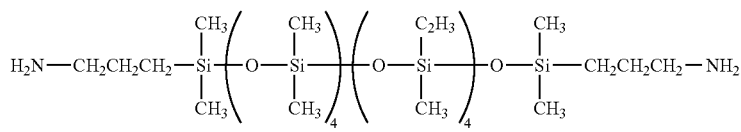

(9)

Then, a reflux condenser provided with a water receptor was attached to the flask and 20.4 g of acetic anhydride and 26.4 g of pyridine were added. The reaction mixture was heated to 50° C. and kept at that temperature for 3 hours.

The solution thus obtained was poured into methanol, poor solvent, to thereby cause reprecipitation of a resin. A polyimide silicone resin with 62 mass % of siloxane moiety was obtained. The infrared absorption spectrum of this resin did not show bands of the polyamic acid, which bands indicate the presence of unreacted functional groups, but the absorption by an imide group was observed at 1780 cm−1 and 1720 cm−1. The resin obtained had the structure represented by the following formula,

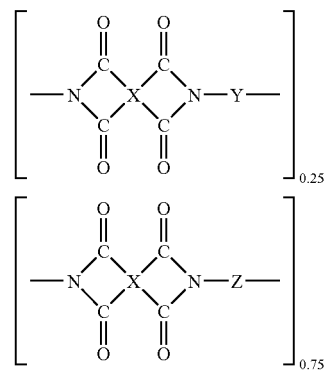

wherein X is

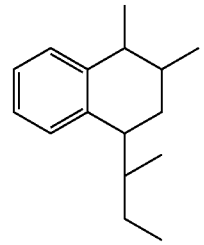

Y is

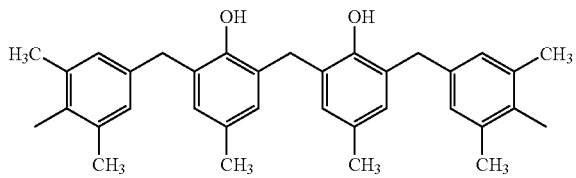

and Z is

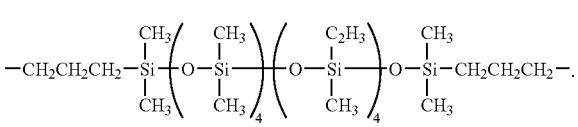

A weight average molecular weight of the resin, reduced to polystyrene, was 32,000, as determined by gel permeation chromatography (GPC) using tetrahydrofuran as a solvent. A film with a thickness of 100 μm was prepared on a quartz glass substrate to determine the light transmittance. The light transmittance at wavelengths of from 350 nm to 450 nm was 80% or higher. The transmission spectrum of this film is shown in FIG. 1.

Preparation Example 2

In a flask provided with a stirrer, a thermometer, and nitrogen purge equipment, 19.6 g (0.1 mole) of 1,2,3,4-cyclobutanetetracarboxylic dianhydride, 250 g of N,N-dimethylacetamide, and 100 g of toluene were placed. Subsequently to the above flask, 12.6 g (0.025 mole) of 2,2'-{2-hydroxy-3-(3, 5-dimethyl-4-amino)-benzyl-5-methyl}-diphenylmethane was added. The reaction mixture was kept at 50° C. for 3 hours. Then, 66.6 g (0.075 mole) of diaminovinylsiloxane represented by the aforesaid formula (9) was added dropwise at room temperature. After the addition was completed, the reaction mixture was stirred at room temperature for 12 hours.

Then, a reflux condenser provided with a water receptor was attached to the flask and 20.4 g of acetic anhydride and 26.4 g of pyridine were added. The reaction mixture was heated to 50° C. and kept at that temperature for 3 hours.

The solution thus obtained was poured into methanol, a poor solvent, to thereby cause a resin to reprecipitate. The polyimide silicone resin with 68 mass % of siloxane moiety was obtained. The infrared absorption spectrum of this resin did not show bands of the polyamic acid, which bands indicate the presence of unreacted functional groups, but the absorption by an imide group was observed at 1780 cm−1 and 1720 cm−1. The resin obtained had the structure represented by the following formula,

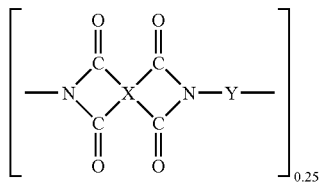

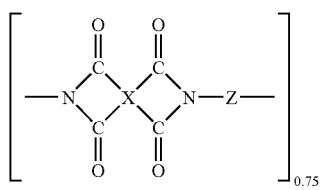

wherein X is

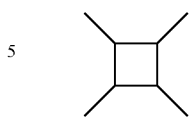

Y is

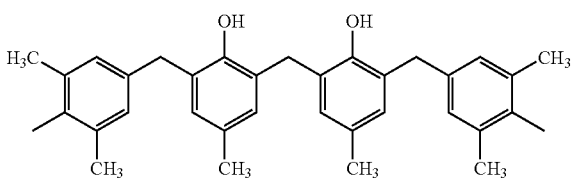

and Z is

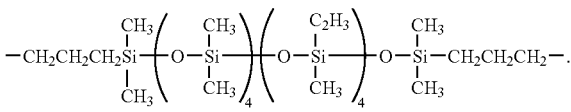

A weight average molecular weight of the resin, reduced to polystyrene, was 20,000, as determined by gel permeation chromatography (GPC) using tetrahydrofuran as a solvent. A film with a thickness 100 μm was prepared on a quartz glass substrate to determine the light transmittance. The film had a transmittance of 80% or higher at wavelengths of from 350 nm to 450 nm.

Preparation Example 3

In a flask provided with a stirrer, a thermometer, and nitrogen purge equipment, 30.0 g (0.1 mole) of 1,3,3a,4,5,9b-hexahydro-5-(tetrahydro-2,5-dioxo-3-furanyl)-naphtho[1,2-c]furan-1,3-dione, 250 g of N,N-dimethylacetamide, and 100 g of toluene were placed. Subsequently, to the above flask, 12.6 g (0.025 mole) of 2,2'-[2-hydroxy-3-(3,5-dimethyl-4-amino)-benzyl-5-methyl]-diphenylmethane was added. The reaction mixture was kept at 50° C. for 3 hours. Then, 65.7 g (0.075 mole) of diaminosiloxane represented by the following formula (11) was added dropwise at room temperature. After the addition was completed, the reaction mixture was stirred at room temperature for 12 hours.

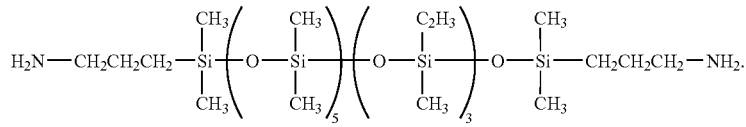

(11)

Then, a reflux condenser provided with a water receptor was attached to the flask and 20.4 g of acetic anhydride and 26.4 g of pyridine were added. The reaction mixture was heated to 50° C. and kept at that temperature for 3 hours.

The solution thus obtained was poured into methanol, poor solvent, to thereby cause reprecipitation of a resin. A polyimide silicone resin with 62 mass % of siloxane moiety was obtained. The infrared absorption spectrum of this resin did not show bands of the polyamic acid, which bands indicate the presence of unreacted functional groups, but the absorption by an imide group was observed at 1780 cm−1 and 1720 cm−1. The resin obtained had the structure represented by the following formula,

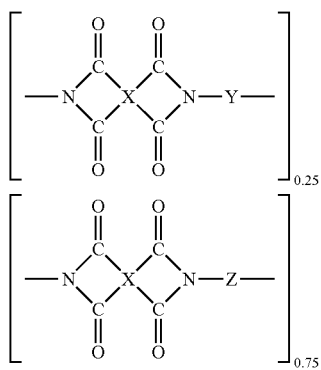

wherein X is

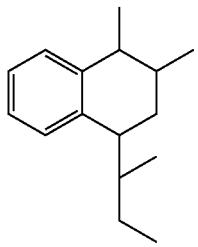

Y is

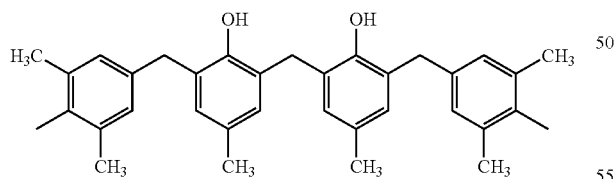

and Z is

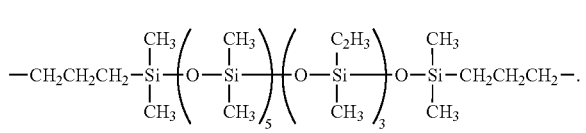

A weight average molecular weight of the resin, reduced to polystyrene, was 32,000, as determined by gel permeation chromatography (GPC) using tetrahydrofuran as a solvent. A film with a thickness of 100 μm was prepared on a quartz glass substrate to determine the light transmittance. The light transmittance at wavelengths of from 350 nm to 450 nm was 80% or higher.

Preparation Example 4

In a flask provided with a stirrer, a thermometer, and nitrogen purge equipment, 30.0 g (0.1 mole) of 1,3,3a,4,5,9b-hexahydro-5-(tetrahydro-2,5-dioxo-3-furanyl)-naphtho[1,2-c]furan-1,3-dione, 250 g of N,N-dimethylacetamide, and 100 g of toluene were placed. Subsequently, to the above flask, 12.6 g (0.025 mole) of 2,2'-[2-hydroxy-3-(3,5-dimethyl-4-amino)-benzyl-5-methyl]-diphenylmethane was added. The reaction mixture was kept at 50° C. for 3 hours. Then, 68.6 g (0.075 mole) of diaminosiloxane represented by the following formula (10) was added dropwise at room temperature. After the addition was completed, the reaction mixture was stirred at room temperature for 12 hours.

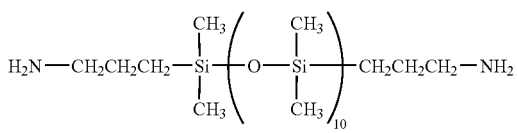

(10)

Then, a reflux condenser provided with a water receptor was attached to the flask and 20.4 g of acetic anhydride and 26.4 g of pyridine were added. The reaction mixture was heated to 50° C. and kept at that temperature for 3 hours.

The solution thus obtained was poured into methanol, poor solvent, to thereby cause reprecipitation of a resin. A polyimide silicone resin with 68 mass % of siloxane moiety was obtained. The infrared absorption spectrum of this resin did not show bands of the polyamic acid, which bands indicate the presence of unreacted functional groups, but the absorption by an imide group was observed at 1780 cm−1 and 1720 cm−1. The resin obtained had the structure represented by the following formula,

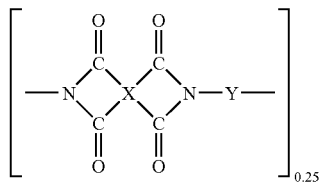

wherein X is

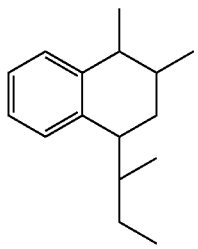

Y is

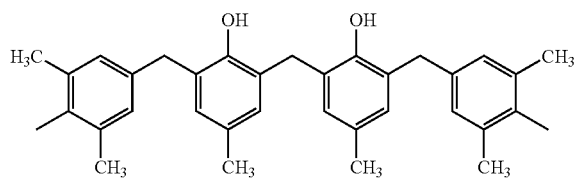

and Z is

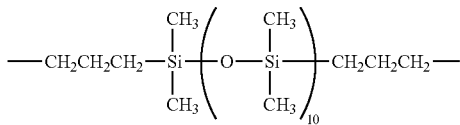

A weight average molecular weight of the resin, reduced to polystyrene, was 22,000, as determined by gel permeation chromatography (GPC) using tetrahydrofuran as a solvent. A film with a thickness of 100 μm was prepared on a quartz glass substrate to determine the light transmittance. The light transmittance at wavelengths of from 350 nm to 450 nm was 80% or higher.

Preparation Example 5

In a flask provided with a stirrer, a thermometer, and nitrogen purge equipment were added 59.7 g (0.167 mole) of 3,3',4,4'-diphenylsulfone tetracarboxylic dianhydride and 400 g of chyclohexanone were placed. Then, a solution of 118.0 g (0.133 mole) of diaminovinylsiloxane represented by the aforesaid formula (9) and 14.4 g (0.033 mole) of bis[4-(3-aminophenoxy)phenyl]sulfone in 50 g of cyclohexanone was added dropwise to the above-mentioned flask while the temperature of the reaction mixture was kept below 50° C. After the addition was completed, the reaction mixture was stirred at room temperature for 10 hours.

Subsequently, a reflux condenser provided with a water receptor was attached to the flask and 40.8 g of acetic anhydride and 52.8 g of pyridine were added. The reaction mixture was heated to 50° C., and kept at that temperature for 3 hours.

The solution thus obtained was poured into methanol, poor solvent, to thereby cause a resin to reprecipitate and the resulting precipitates were dried. The polyimide silicone resin with 61 mass % of siloxane moiety was obtained.

The infrared absorption spectrum of this resin did not show bands of the polyamic acid, which bands indicate the presence of unreacted functional groups, but the absorption by an imide group was observed at 1780 cm−1 and 1720 cm−1. The resin obtained had the structure represented by the following formula,

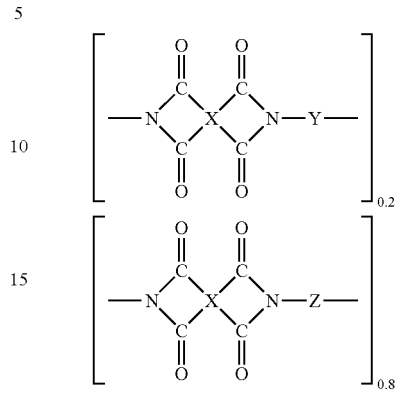

wherein X is

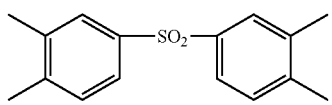

Y is

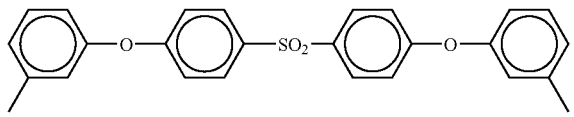

and Z is

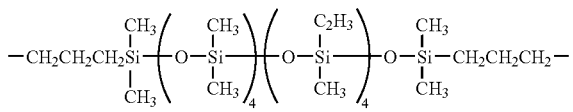

A weight average molecular weight of the resin, reduced to polystyrene, was 31,000, as determined by gel permeation chromatography (GPC) using tetrahydrofuran as a solvent.

A film with thickness of 100 μm was prepared on a quartz glass substrate to determine the light transmittance. The film showed a light transmittance less than 80% at wavelengths of from 350 nm to 450 nm. The transmission spectrum of this film is shown in FIG. 2.

Example 1

Fifty grams of the polyimide silicone resin prepared in Preparation Example 1, 100 g of isobornyl acrylate, and 5 g of 2,2-dimethoxy-2-phenylacetophenone were combined and stirred in a flask to obtain a polyimide silicone resin composition. The composition had a viscosity of 10 Pa-s. The polyimide silicone resin composition was applied on a glass plate to form a film having a thickness of 1 mm and then irradiated with UV light using a high-pressure mercury lamp, with an integrated exposure being 1000 mJ/m², to obtain a cured film.

Appearance of the cured film was visually observed. Adhesion of the film was evaluated by a crosshatch peel test. The results are as shown in Table 1.

The procedures of the crosshatch peel test are as follows.

Crosshatch Peel Test

The cured film was exposed to conditions of 80° C. and 95% of RH for 24 hours. The adhesion to the glass plate before and after the exposure was evaluated according to the Japanese Industrial Standards K5400.

Example 2

Fifty grams of the polyimide silicone resin prepared in Preparation Example 1, 50 g of isobornyl acrylate, and 5 g of 2-hydroxy-2-methyl-1-phenylpropan-1-one were combined and stirred in a flask to obtain a polyimide silicone resin composition. This composition had a viscosity of 90 Pa·s. A cured film of the polyimide silicone resin composition was obtained of which appearance and adhesion were evaluated as in Example 1.

Example 3

Fifty grams of the polyimide silicone resin prepared in Preparation Example 2, 100 g of isobornyl acrylate, and 5 g of 2-hydroxy-2-methyl-1-phenylpropan-1-one were combined and stirred in a flask to obtain a polyimide silicone resin composition. This composition had a viscosity of 8 Pa·s. A cured film of the polyimide silicone resin composition was obtained of which appearance and adhesion were evaluated as in Example 1.

Example 4

Fifty grams of the polyimide silicone resin prepared in Preparation Example 3, 50 g of isobornyl acrylate, and 5 g of 2-hydroxy-2-methyl-1-phenylpropan-1-one were combined and stirred in a flask to obtain a polyimide silicone resin composition. This composition had a viscosity of 85 Pa·s. A cured film of the polyimide silicone resin composition was obtained of which appearance and adhesion were evaluated as in Example 1.

Referential Example 1

Fifty grams of the polyimide silicone resin prepared in Preparation Example 4, 50 g of isobornyl acrylate, and 5 g of 2-hydroxy-2-methyl-1-phenylpropan-1-one were combined and stirred in a flask to obtain a polyimide silicone resin composition. This composition had a viscosity of 80 Pa·s. A cured film of the polyimide silicone resin composition was obtained of which appearance and adhesion were evaluated as in Example 1.

Comparative Example 1

Fifty grams of the polyimide silicone resin prepared in Preparation Example 5, 100 g of isobornyl acrylate, and 1 g of 2,2-dimethoxy-2-phenylacetophenone were combined and stirred in a flask to obtain a polyimide silicone resin composition. This composition had a viscosity of 10 Pa·s. A cured film of the polyimide silicone resin composition was obtained of which appearance and adhesion were evaluated as in Example 1.

Results are as shown in Table 1.

TABLE 1

| | Appearance | Adhesion (before exposure) | Adhesion (after exposure) |
|---|---|---|---|
| Example 1 | Colorless and transparent | 0/100 | 0/100 |
| Example 2 | Colorless and transparent | 0/100 | 0/100 |
| Example 3 | Colorless and transparent | 0/100 | 0/100 |
| Example 4 | Colorless and transparent | 0/100 | 0/100 |
| Referential Example 1 | Cloudy | 0/100 | 0/100 |
| Comparative Example 1 | Brown and transparent | 100/100 (undercured in the vicinity the substrate) | 100/100 (undercured in the vicinity of the substrate) |

The polyimide silicone resin in Referential Example 1 did not have a photopolymerizable group and a cured film of the resin was cloudy.

The polyimide silicone resin in Comparative Example 1 showed a light transmittance less than 80% at wavelengths of from 350 nm to 450 nm. The film obtained from the resin was brown and undercured because the resin interfered with the light absorption of the photopolymerization initiator.

In contrast, all of the cured films obtained in Examples 1 to 4 were colorless and transparent, and showed good adhesion.

INDUSTRIAL APPLICABILITY

The present polyimide silicone resin composition is readily cured by light to give a colorless and transparent film because the polyimide silicone resin does not inhibit light absorption of the reactive diluents. Being solvent-free, the present composition is not hazardous to the environment and useful as an adhesive or coating material for electrical and electric appliances and semiconductor chips.

The invention claimed is:

1. A solvent-free polyimide silicone resin composition comprising (a) a polyimide silicone resin having repeating units represented by the following formula (1-1) and repeating units represented by the following formula (1-2), a film of said resin with a thickness of 100 μm prepared on a quartz glass substrate having a light transmittance of 80% or higher at wavelengths of from 350 nm to 450 nm, (b) a reactive diluent, and (c) a photopolymerization initiator

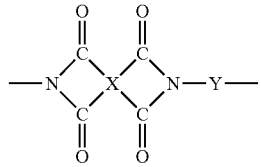

(1-1)

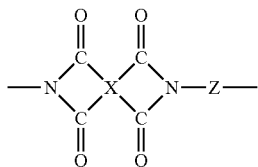

(1-2)

wherein X is a tetravalent organic group, Y is a divalent organic group, and Z is a divalent organic group represented by the following formula (2),

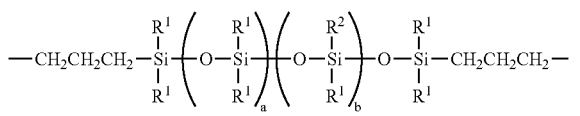

(2)

wherein $R^1$ may be different from each other and is a monovalent hydrocarbon group having 1 to 8 carbon atoms, which group may be substituted, $R^2$ is a monovalent hydrocarbon group having a photopolymerizable group, a and b are each an integer of from 1 to 100 with $a+b \leqq 100$.

2. The solvent-free polyimide silicone resin composition according to claim 1, wherein b/(a+b) is 0.05 or larger in the formula (2).

3. The solvent-free polyimide silicone resin composition according to claim 1, wherein the photopolymerizable group in $R^2$ in the formula (2) is an alkenyl group.

4. The solvent-free polyimide silicone resin composition according to claim 1, wherein X in the formula (1-1) is at least one organic group selected from the groups represented by the formula (3), (4), (5), (6) or (7),

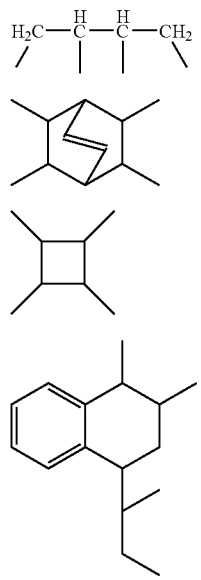

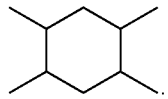

(7)

5. The solvent-free polyimide silicone resin composition according to claim 1, wherein Z is present in an amount of 30 mass % or more in the polyimide silicone resin.

6. The solvent-free polyimide silicone resin composition according to claim 1, wherein the reactive diluent is a (meth) acrylic compound.

7. The solvent-free polyimide silicone resin composition according to claim 1, wherein the photopolymerization initiator is at least one selected from the group consisting of acetophenone derivatives, benzophenone derivatives, benzoin ether derivatives, and xanthone derivatives.

8. The solvent-free polyimide silicone resin composition according to claim 1, wherein the composition comprises 100 parts by mass of the polyimide silicone resin, 20 to 2000 parts by mass of the reactive diluent and 1 to 200 parts by mass of the photopolymerization initiator.

9. The solvent-free polyimide silicone resin composition according to claim 1, wherein the composition is flowable at 25° C.

10. The solvent-free polyimide silicone resin composition according to claim 1, wherein the composition has a viscosity of 10,000 Pa·s or lower at 25° C.

11. A resin film obtained by photocuring a solvent-free polyimide silicone resin composition comprising (a) a polyimide silicone resin having repeating units represented by the following formula (1-1) and repeating units represented by the following formula (1-2), wherein a film of said polyimide silicon resin with a thickness of 100 μm prepared on a quartz glass substrate has a light transmittance of 80% or higher at wavelengths of from 350 nm to 450 nm, (b) a reactive diluent, and (c) a photopolymerization initiator

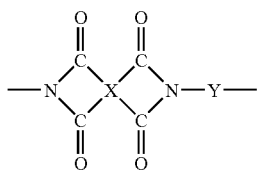

(1-1)

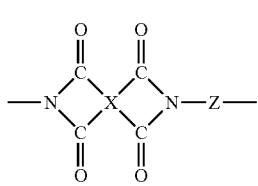

(1-2)

wherein X is a tetravalent organic group, Y is a divalent organic group, and Z is a divalent organic group represented by the following formula (2), (2)

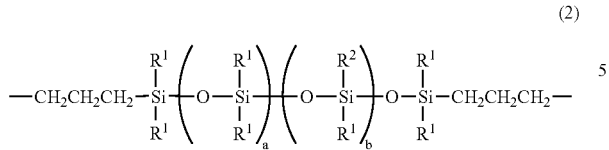

wherein $R^1$ may be different from each other and is a monovalent hydrocarbon group having 1 to 8 carbon atoms, which group may be substituted, $R^2$ is a monovalent hydrocarbon group having a photopolymerizable group, a and b are each an interger of from 1 to 100 with a+b<100.

12. The resin film of claim 11, wherein b(a+b) in the solvent-free polyimide silicone resin composition is 0.05 or larger in the formula (2).

13. The resin film of claim 11, wherein the photopolymerizable group in $R^2$ in the formula (p2) in the solvent-free polyimide silicone resin composition is an alkenyl group.

14. The resin film of claim 11, wherein X in the formula (1-1) in the solvent-free polyimide silicone resin composition is at least one organic group selected from the groups represented by the formula (3), (4), (5), (6) or (7), (3)

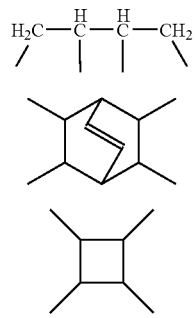

(4)

(5)

-continued (6)

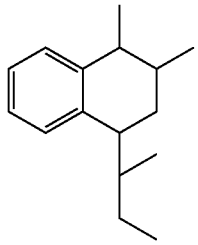

(7)

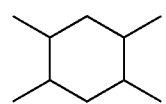

15. The resin film of claim 11, wherein Z in the solvent-free polyimide silicone resin composition is present in an amount of 30 mass % or more in the polyimide silicone resin.

16. The resin film of claim 11, wherein the reactive diluent in the solvent-free polyimide silicone resin composition is a (meth)acrylic compound.

17. The resin film of claim 11, wherein the photopolymerization initiator in the solvent-free polyimide silicone resin composition is at least one selected from the group consisting of acetophenone derivatives, benzophenone derivatives, benzoin ether derivatives, and xanthone derivatives.

18. The resin film of claim 11, wherein the solvent-free polyimide silicone resin composition comprises 100 parts by mass of the polyimide silicone resin, 20 to 2000 parts by mass of the reactive diluent and 1 to 200 parts by mass of the photopolymerization initiator.

19. The resin film of claim 11, wherein the solvent-free polyimide silicone resin composition is flowable at 25° C.

20. The resin film of claim 11, wherein the solvent-free polyimide silicone resin composition has a viscosity of 10,000 Pa•s or lower at 25° C.

21. An electronic part comprising the resin film according to any one of claims 11 and 12 to 20.

* * * * *